(12) United States Patent
Zeng et al.

(10) Patent No.: US 12,438,335 B2
(45) Date of Patent: Oct. 7, 2025

(54) HIGH-PRECISION REPETITION RATE LOCKING APPARATUS FOR ULTRA-FAST LASER PULSE

(71) Applicants: Chongqing Institute of East China Normal University, Chongqing (CN); East China Normal University, Shanghai (CN); Yunnan Huapu quantum Material Co., Ltd, Yunnan (CN); ROI Optoelectronics Technology CO, LTD., Shanghai (CN); Chongqing Huapu Scientific Instrument Co.,Ltd., Chongqing (CN); Chongqing Huapu Intelligent Equipment Co., Ltd., Chongqing (CN); GuangDong ROI Optoelectronics Technology Co., Ltd., Guangdong (CN)

(72) Inventors: Heping Zeng, Chongqing (CN); Kun Huang, Chongqing (CN); Tingting Yu, Chongqing (CN); Mengyun Hu, Chongqing (CN)

(73) Assignees: CHONGQING INSTITUTE OF EAST CHINA NORMAL UNIVERSITY, Chongqing (CN); EAST CHINA NORMAL UNIVERSITY, Shanghai (CN); YUNNAN HUAPU QUANTUM MATERIAL CO., LTD, Yunnan (CN); ROI OPTOELECTRONICS TECHNOLOGY CO, LTD., Shanghai (CN); CHONGQING HUAPU SCIENTIFIC INSTRUMENT CO., LTD., Chongqing (CN); CHONGQING HUAPU INTELLIGENT EQUIPMENT CO., LTD., Chongqing (CN); GUANGDONG ROI OPTOELECTRONICS TECHNOLOGY CO., LTD., Guangdong (CN)

(*) Notice: Subject to any disclaimer, the term of this patent is extended or adjusted under 35 U.S.C. 154(b) by 546 days.

(21) Appl. No.: 17/936,663

(22) Filed: Sep. 29, 2022

(65) Prior Publication Data
US 2023/0114758 A1 Apr. 13, 2023

(30) Foreign Application Priority Data
Sep. 30, 2021 (CN) ............ 202111159106.2

(51) Int. Cl.
*H01S 3/067* (2006.01)
*H01S 3/091* (2006.01)
(Continued)

(52) U.S. Cl.
CPC .......... *H01S 3/1112* (2013.01); *H01S 3/0912* (2013.01); *H01S 3/1109* (2013.01); *H01S 3/13* (2013.01); *H01S 3/0675* (2013.01)

(58) Field of Classification Search
CPC .... H01S 3/1109; H01S 3/1112; H01S 3/0912; H01S 3/13; H01S 3/0675; H01S 3/09415;
(Continued)

(56) References Cited

U.S. PATENT DOCUMENTS

| 5,828,680 A * | 10/1998 | Kim ............... H01S 3/06791 372/18 |
| 2004/0086019 A1* | 5/2004 | Kim ............... H01S 3/06791 372/6 |

(Continued)

FOREIGN PATENT DOCUMENTS

| CN | 113074665 A | 7/2021 | |
| JP | 2018139279 A * | 9/2018 | ............... E01H 4/02 |

OTHER PUBLICATIONS

CNIPA, First Office Action for CN Application No. 202111159106.2, Dec. 14, 2022.

*Primary Examiner* — Xinning(Tom) Niu
(74) *Attorney, Agent, or Firm* — HODGSON RUSS LLP

(57) ABSTRACT

A high-precision repetition rate locking apparatus for an ultra-fast laser pulse includes: an electronic controlling component comprising: a standard clock, configured to provide a high-precision frequency standard; a pulse generator (PG), configured to provide an electrical pulse signal with adjustable repetition rate, pulse width and voltage magnitude; and a signal generator (SG), connected to the standard clock and the PG, and configured to provide a stable frequency signal for the PG, a phase-shift adjusting component, connected to the electronic controlling component and configured to implement phase modulation through electrically induced refractive index change; a resonant cavity component, comprising a phase shifter, a doped fiber, a laser diode, a wavelength division multiplexer and a reflector, and configured to generate a mode-locked pulse; and a detection system, configured to measure a repetition rate of an output pulse.

8 Claims, 3 Drawing Sheets

(51) Int. Cl.
  *H01S 3/1109* (2023.01)
  *H01S 3/1112* (2023.01)
  *H01S 3/13* (2006.01)
(58) Field of Classification Search
  CPC .... H01S 3/06791; H01S 3/1304; H01S 3/136; H01S 3/107; H01S 3/1121; H01S 3/1307; H01S 3/067; H01S 3/10053; H01S 3/1106; H01S 3/1305
  See application file for complete search history.

(56) References Cited

U.S. PATENT DOCUMENTS

| | | | |
|---|---|---|---|
| 2005/0201432 A1* | 9/2005 | Uehara | H01S 3/106 372/30 |
| 2013/0003766 A1* | 1/2013 | Savchenkov | H01S 5/142 372/32 |
| 2019/0288479 A1* | 9/2019 | Kawahara | H01S 3/10015 |

* cited by examiner

HIGH-PRECISION REPETITION RATE LOCKING APPARATUS FOR ULTRA-FAST LASER PULSE

CROSS-REFERENCE TO RELATED APPLICATION

This application claims priority to Chinese Patent Application No. 202111159106.2, filed Sep. 30, 2021, the entire disclosure of which is incorporated herein by reference.

FIELD

The present disclosure relates to the field of ultra-fast photology and laser technology, and more particularly to a high-precision repetition rate locking apparatus and technology for ultra-fast laser pulse.

BACKGROUND

Ultra-fast laser pulses, due to the advantages of high peak power and narrow pulse width, are important carriers for precision measurement and optical fiber communication, and are widely used in high time-resolution spectroscopy, fluorescent lifetime imaging microscopy, and laser material processing. In particular, a long-term stable operation and high-precision of repetition rate play a key role for specific applications. For example, high-precision time-domain stable pulse sequences with long-term stable operation can significantly reduce the error rate of optical communications. In addition, as a key technology for spectro-temporal control of ultra-fast optical fields, the precise locking of the pulse repetition rate is one of the core steps in the construction of high-precision optical frequency combs, which can provide support for high-precision time transfer, high-precision spectral analysis and other fields.

In general, the locking of the repetition rate of a laser usually requires precise control of an optical path variation of the laser cavity. A direct method is to control the geometric length, which is usually achieved by attaching intra-cavity fiber on a piezoelectric transducer. However, this method will inevitably lead to fiber bending, resulting in loss and birefringence. Moreover, this method is sensitive to environmental disturbance and has poor long-term stability, the working performance will decrease due to the wear of mechanical components. Another common method is to change the optical path by controlling the refractive index of the propagation medium. For example, by modulating the intensity of pumping light loaded on a gain fiber, population inversion of doped ions in the fiber is changed, so as to control the nonlinear refractive index of the propagation medium and realize the control of the optical cavity length of the entire laser. Although the feedback bandwidth of this technology is higher than 100 Hz that is achieved by using a piezoelectric transducer, it is limited at the kHz level due to the limitation of the lifetime of the excited state of doped ions.

Therefore, the existing repetition rate locking technology faces two bottlenecks. One is that the feedback bandwidth is limited by its own mechanism, and it is unable to achieve ultra-high-speed feedback control. The other one is that the locking range of the cavity length is short, generally in the order of 10-100 μm, it is difficult to achieve long-term stable operation of the repetition rate locking, and additional temperature control and vibration isolation design are usually required.

SUMMARY

Embodiments of the present disclosure seek to solve at least one of the problems existing in the related art to at least some extent.

According to a first aspect of the present disclosure, a high-precision repetition rate locking apparatus for an ultra-fast laser pulse is provided. The high-precision repetition rate locking apparatus includes: an electronic controlling component, a loop mirror, a phase-shift adjusting component, a resonant cavity component and a detecting component. The electronic controlling component is configured to provide a high-precision radio-rate electrical pulse signal, and includes a standard clock, an electrical pulse generator (PG) and a signal generator (SG). The standard clock is configured to provide a high-precision frequency standard. The PG is configured to provide an electrical pulse signal with adjustable repetition rate, pulse width and voltage magnitude. The SG is connected to the standard clock and the PG, and configured to provide a stable frequency signal for the PG. The loop mirror is connected to the electronic controlling component. The phase-shift adjusting component is disposed in the loop mirror and connected to the electronic controlling component, and configured to implement phase modulation through electrically induced refractive index change of a crystal in the phase-shift adjusting component. The resonant cavity component includes a phase shifter, a doped fiber, a laser diode, a wavelength division multiplexer and a reflector, and configured to generate a mode-locked pulse. The detecting component is configured to measure a repetition rate of an output pulse.

It should be appreciated that, the general description hereinbefore and the detail description hereinafter are explanatory and illustrative, and shall not be construed to limit the present disclosure.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
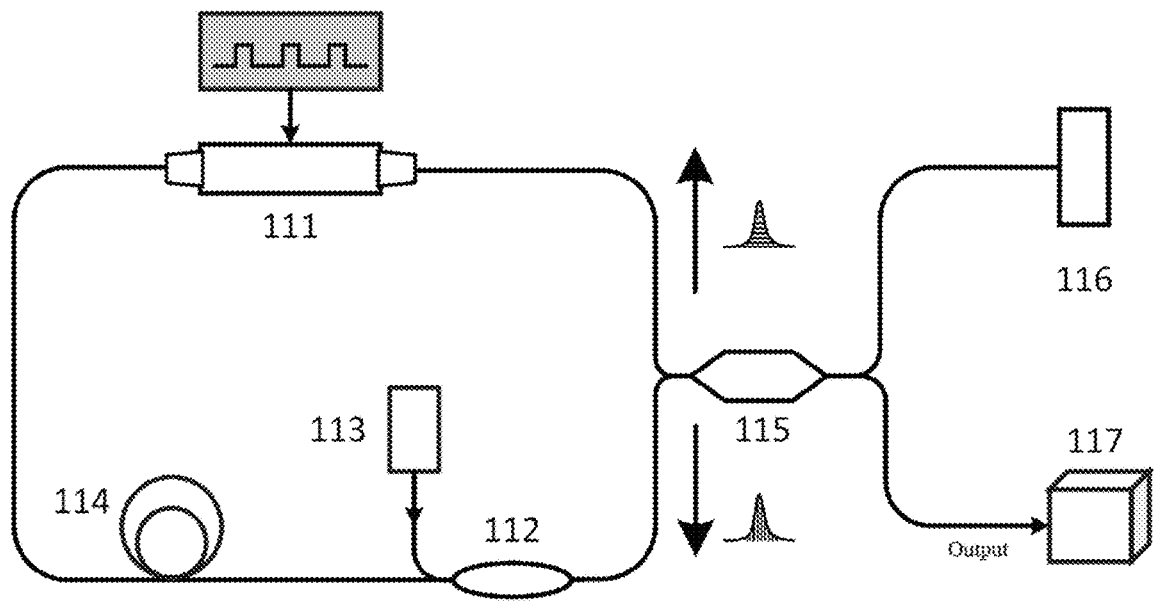
FIG. 1 is a schematic diagram showing a high-precision repetition rate locking apparatus for ultra-fast laser pulses according to some examples of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

Embodiments of the present disclosure provide a high-precision repetition rate locking technology and apparatus for ultra-fast laser pulses, in which a phase modulator is added in a nonlinear amplifying loop mirror, high-speed non-commutative phase shift control is obtained by highly stable electrical modulation pulse, so as to realize trigger and generation of synchronous mode-locked pulse, and output of repetition rate locked ultra-fast pulse is finally realized by virtue of a passive synchronization technology between the electrical pulse and the optical pulse, with a locking precision approaching an atomic clock precision of a reference clock of an RF signal. The apparatus eliminates a complex device used for active feedback, achieves broadband feedback control through high-speed phase modulation, achieves a cavity length locking range in millimeter scale, and can realize long-term stable operation without temperature control and vibration isolation.

The high-precision repetition rate locking apparatus according to embodiments of the present disclosure includes: an electronic controlling component, a loop mirror, a phase-shift adjusting component, a resonant cavity component, and a detecting component. The electronic controlling component is configured to provide a high-precision radio-frequency electrical pulse signal, and includes a standard clock, a pulse generator (PG) and a signal generator (SG). The standard clock is configured to provide a high-precision frequency standard. The PG is configured to provide an electrical pulse signal with adjustable repetition rate, pulse width and voltage magnitude. The SG is connected to the standard clock and the PG, and configured to provide a stable frequency signal for the PG. The loop mirror is connected to the electronic controlling component. The phase-shift adjusting component is disposed in the loop mirror and connected to the electronic controlling component, it configured to implement phase modulation through electrically induced refractive index change of a crystal in the phase-shift adjusting component. The resonant cavity component includes a phase shifter, a doped fiber, a laser diode, a wavelength division multiplexer and a reflector, and configured to generate a mode-locked pulse. The detecting component is configured to measure a repetition rate of an output pulse.

In some embodiments, the phase-shift adjusting component is a phase modulator.

In some embodiments, the phase modulator is an electro-optic modulator based on a $LiNbO_3$ crystal.

In some embodiments, the PG is a nanosecond pulse generator for providing an ultrashort pulse.

In some embodiments, the detecting component comprises a photoelectric detector and a frequency counter.

In some embodiments, the standard clock is a hydrogen clock or a rubidium clock.

In some embodiments, the electrical pulse signal generated by the PG has a pulse width from 1 to 15 ns and an adjustable amplitude range from 0 to 3 V.

In some embodiments, the doped fiber is an erbium-doped fiber or an ytterbium-doped fiber.

In some embodiments, the reflector is a fiber Bragg grating or an optic fiber mirror.

The high-precision repetition rate locking technology and apparatus according to embodiments of the present disclosure is based on a fiber laser of nonlinear amplifying loop mirror type, introduces an electronically controllable high-precision non-commutative phase shifting component in the loop mirror, realizes high bandwidth passive feedback control of mode-locked ultra-short pulses by virtue of self-adaptive dynamic regulation of the formation process of ultra-fast pulses in the laser cavity, and achieves high-precision repetition-rate locking close to the precision of an atomic clock in combination with high-precision radio-frequency (RF) modulation signals. This apparatus does not need any active feedback control, has a simple structure, and can run stably for a long time.

The embodiments of the present disclosure have the following beneficial technical effects.

(1) In embodiments of the present disclosure, a broadband photoelectric modulator is introduced into the nonlinear loop mirror, so as to realize high-speed non-commutative phase shift control, which greatly improves the feedback bandwidth of repetition rate locking.

(2) Embodiments of the present disclosure adopt a repetition rate locking mechanism based on passive pulse synchronization, and the locking precision can be traced back to a precision of an atomic clock referenced by an electrical regulation pulse.

(3) In embodiments of the present disclosure, in virtue of the self-adaptive process of the ultra-fast laser pulse in the laser cavity, a required group velocity is obtained by dynamically changing a center wavelength to match the jitter of the cavity length, and a long-distance cavity length locking range is obtained.

(4) Embodiments of the present disclosure avoid an analog feedback circuit required for active locking, and the overall structure adopts a full-polarization-maintaining fiber, which makes the apparatus of the present disclosure with a robust and tight locking for the repetition rate.

In the following, the high-precision repetition rate locking technology and apparatus according to embodiments of the present disclosure will be described in detail referring to the accompanied drawings.

The high-precision repetition rate locking technology for an ultra-fast laser pulse may be implemented by a high-precision repetition rate locking apparatus as shown in FIG. 1. The apparatus includes an electronic controlling component 110, a resonant cavity component, a loop mirror, a phase-shift adjusting component 111, a semiconductor diode 113, and a detection system 117.

The electronic controlling component 110 is configured to generate a high-precision radio-frequency (RF) signal electrical pulse. The electronic controlling component 110 includes a standard clock, a signal generator and a pulse generator. The standard clock is configured to provide a high-precision frequency standard. The SG is connected to the standard clock and the PG, and is configured to provide a high-stability frequency signal for PG. The PG is configured to provide an electrical pulse signal with adjustable repetition rate, pulse width and voltage magnitude. In some examples, the PG may be a nanosecond pulse generator to provide an ultrashort electrical pulse signal.

The phase-shift adjusting component is connected to the electronic controlling component 110 and configured to implement phase modulation through electrically induced refractive index change. In some embodiments, the phase-shift adjusting component 111, e.g., a phase modulator, is placed in the loop mirror.

The resonant cavity component has a resonant cavity and is configured for synchronous passive mode-locking. The resonant cavity component includes a wavelength division multiplexer 112, a semiconductor diode 113, a doped fiber 114, a coupler 115 and a reflector 116. The semiconductor diode 113 is configured to provide a pump source for a laser, which is injected into the resonant cavity through the wavelength division multiplexer 112 of reflective type. The reflector 116 is configured as an optical fiber mirror of the resonant cavity component to reflect optical pulses, and the optical pulses reflected back by the reflector 116 pass through the coupler 115 to generate two optical pulses, one of which runs clockwise, and the other one runs counterclockwise, and the pulses enter the loop mirror. The reflector 116 may be, for example, a fiber Bragg grating or an optic fiber mirror. When a phase shift difference (including a nonlinear phase shift difference and a linear phase shift difference introduced by the phase modulator 111) accumulated by peak parts of the two optical pulses reaches π, a stable mode-locked pulse is formed, which can be observed by the detection system 117 positioned at an output end of the apparatus.

Figure 2:
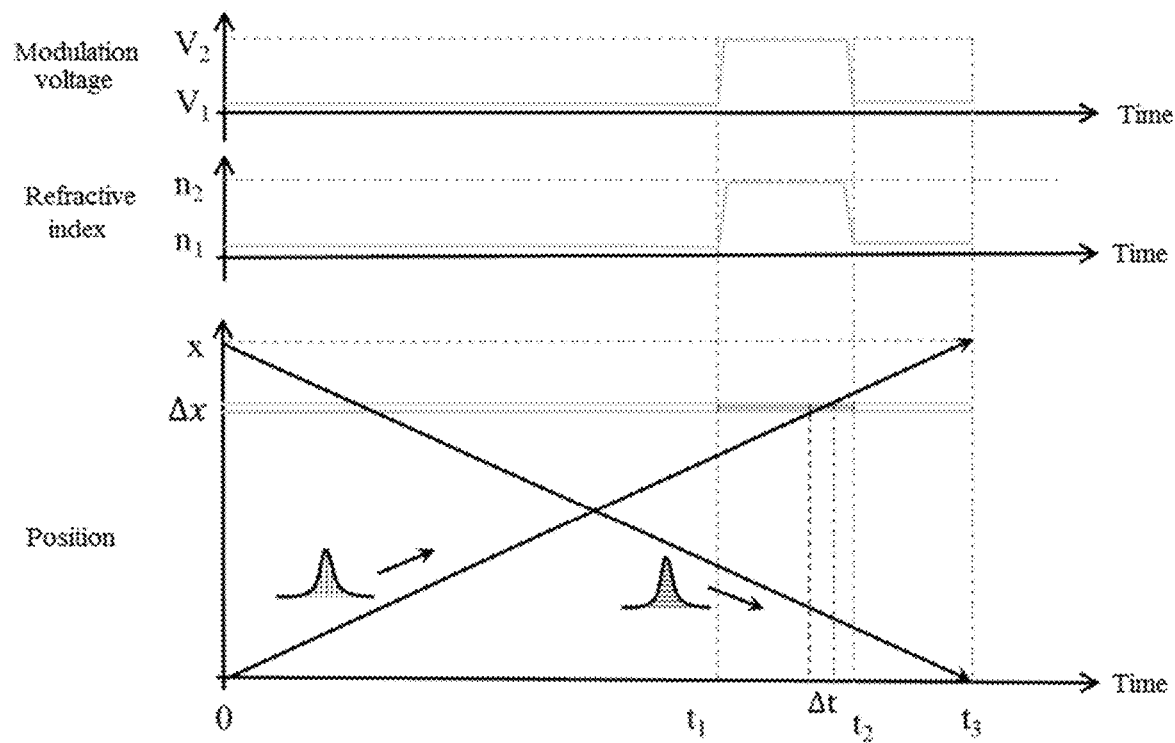
FIG. 2 is a schematic graph showing a principle of a high-precision repetition rate locking technology for an ultra-fast laser pulse according to some examples of the present disclosure.

FIG. 2 is a schematic graph showing a principle of a high-precision repetition rate locking technology to further illustrate dynamic evolution processes of pulses involved therein. As a modulation voltage increases from $V_1$ to $V_2$, a refractive index of a crystal in the phase modulator increases from $n_1$ to $n_2$. Time and space origin of evolution is set at the coupler 115, a total length of the loop mirror is x, and the time used by the pulses to pass through the loop mirror is $t_3$. In a time interval from 0 to $t_3$, the pulse running clockwise in the loop mirror goes from position 0 to position x, while the pulse running counterclockwise goes from position x to position 0. The crystal in the phase modulator has a length Δx, and the time for the pulse to pass through the crystal is Δt. The phase modulator is placed at a symmetrical position of the loop mirror, and the time point when the pulse running clockwise passes through the phase modulator is different from the time when the pulse running counterclockwise passes through the phase modulator. An abscissa of an intersection of a space-time line corresponding to pulse transmission and a position coordinate of the phase modulator indicates the time point when the pulse passes through the phase modulator. A time interval corresponding to a high level of the electrical pulse is from $t_1$ to $t_2$, so when the pulse running clockwise passes through the phase modulator, the electrical pulse is at a low level while when the pulse running counterclockwise passes through the phase modulator, the electrical pulse is at a high level, so that an additional linear phase shift difference may be obtained for the bidirectional pulses. Based on the interference effect of the bidirectional pulses at the coupler 115, the high-speed modulation of the phase difference can produce high-speed intensity modulation of the optical pulses, so as to cause high-speed change in the intra-cavity loss. Usually, initial formation of a mode-locked pulse is relatively easy to occur where loss changes (such as a rising edge or a falling edge of the electrical pulse), that is, the stable electrical modulation pulse can realize the precise time triggering of the mode-locked pulse. Moreover, when a cavity length of the laser changes slightly, relative positions of the optical pulse and the electrical pulse will change, result the change of linear phase shift difference introduced by the phase modulator. In order to restore to a suitable phase difference (such as π phase), the wavelength of the mode-locked pulse will undergo a small self-adaptive shift, and the change in the cavity length is compensated by intra-cavity group velocity dispersion, finally making the repetition rate from the optical pulse and electrical pulse consistent, so that passive feedback control of the repetition rate of the optical pulse is realized. The stabilized repetition rate of the electrical pulse can be traced back to the high-precision reference signal, which greatly improves the locking precision of the repetition rate from the optical pulse. In addition, the described locking mechanism eliminates physical stretching of piezoelectric ceramics, and a long-distance capture range can be obtained through a self-adaptive locking process.

Figure 3:
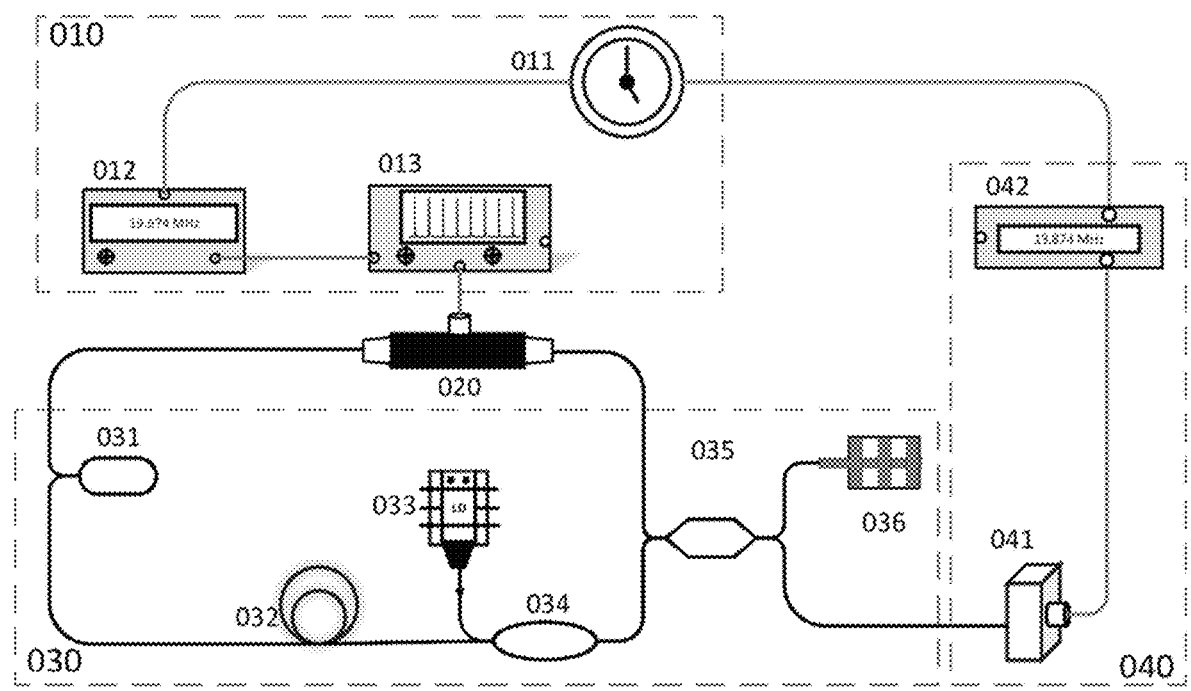
FIG. 3 is a schematic diagram of a high-precision repetition rate locking apparatus for ultra-fast laser pulses according to some examples of the present disclosure.

FIG. 3 is a schematic diagram of a high-precision repetition rate locking apparatus for an ultra-fast laser pulse according to examples of the present disclosure. The apparatus includes an electronic controlling component 010, a phase-shift adjusting component 020, a resonant cavity component 030 and a detecting component 040.

The electronic controlling component 010 includes a standard clock 011, a signal generator 012 and an electrical pulse generator 013, and is configured to provide a high-precision electrical pulse signal.

In some examples, the phase-shift adjusting component 020 may be a phase modulator, and is configured to implement phase modulation through electrically induced refractive index change.

The resonant cavity component 030 includes a phase shifter 031, a doped fiber 032, a laser diode 033, a wavelength division multiplexer 034 and a fiber Bragg grating 036, and is configured to generate a mode-locked pulse. Alternatively, the fiber Bragg grating 036 may be replaced by an optic fiber mirror.

The detecting component 040 includes a photoelectric detector 041 and a frequency counter 042, and is configured to measure and characterize the repetition rate of the output pulse.

The standard clock 011 is used as a frequency reference. In some examples, the standard clock 011 may be a hydrogen clock or a rubidium clock.

The electrical pulse generator 013 is able to generate an electrical pulse with a pulse width ranging from 1 to 15 ns and has an adjustable amplitude range of 0 to 3 V.

The doped fiber 032 is configured to provide a gain medium, and may adopt an erbium-doped fiber or an ytterbium-doped fiber.

The phase modulator 020 may be an electro-optic modulator based on a lithium niobate crystal, and a modulation bandwidth is 10 GHz for 3 dB.

The optical fiber device is a polarization-maintaining device, and connecting parts of the optical fiber are all polarization-maintaining fibers.

Example 1

(1) Passive mode locking of a fiber laser: adjust a value of a current injected into the laser diode 033, increase a pumping power to above a mode locking threshold of the fiber laser, and obtain stabilized passive mode-locked pulses.

(2) Measurement of a repetition rate of the laser under free running: connect an output end of the laser to the photoelectric detector 041, and measure the pulse's repetition rate value $f_0$ through the frequency counter 042.

(3) Precise locking of the repetition rate of the laser: take the standard clock 011 as an external clock of the signal generator 012 and the frequency counter 042 to provide a high-precision rate reference for regulation and detection, set an output frequency of the signal generator 012 to be $f_0$, output by the SG a sinusoidal electrical signal with a stable rate as an external trigger of the electrical pulse generator 013, adjust the amplitude and width of the electrical pulse output by the electrical pulse generator 013 and transmit the electrical pulse to the phase modulator 020 to realize passive locking of the repetition rate of the laser.

(4) Characterization and analysis of repetition rate locking precision and cavity length locking range: connect the output end of the laser to the photoelectric detector 041, and record a repetition rate value $f_r$ of the pulse by the frequency counter 042, analyze a standard deviation of the repetition rate value through multiple measurement and statistics to characterize the precision and stability of the repetition rate locking; and change the output frequency of the SG 012 or change the cavity length of the laser to observe whether the optical pulse output by the laser is synchronized with the electrical pulse so as to measure the tolerance of repetition rate offset or the cavity length locking range.

Figure 4:
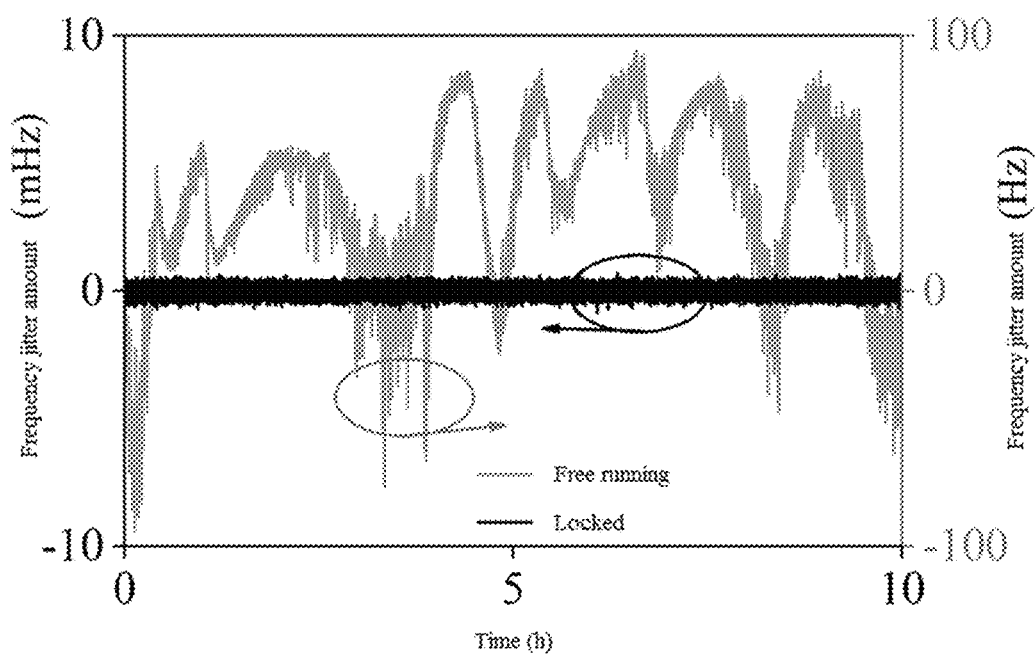
FIG. 4 is a schematic graph showing laser free running and repetition rate locked according to some examples of the present disclosure.

FIG. 4 is a schematic graph showing laser free running and repetition rate locked according to examples of the present disclosure, where a sampling interval is 1 s and the collection time is 10 h. Specifically, a curve obtained before the repetition rate locking corresponds to the passive mode-locking state of the laser under free running, and the standard deviation of the repetition rate is 54 Hz. The standard deviation after the repetition rate locking is 159 µHz, corresponding to a fractional instability of $7 \times 10^{-12}$ relative to the average value of the repetition rate of 21 MHz, which is close to the precision of the reference source.

Figure 5:
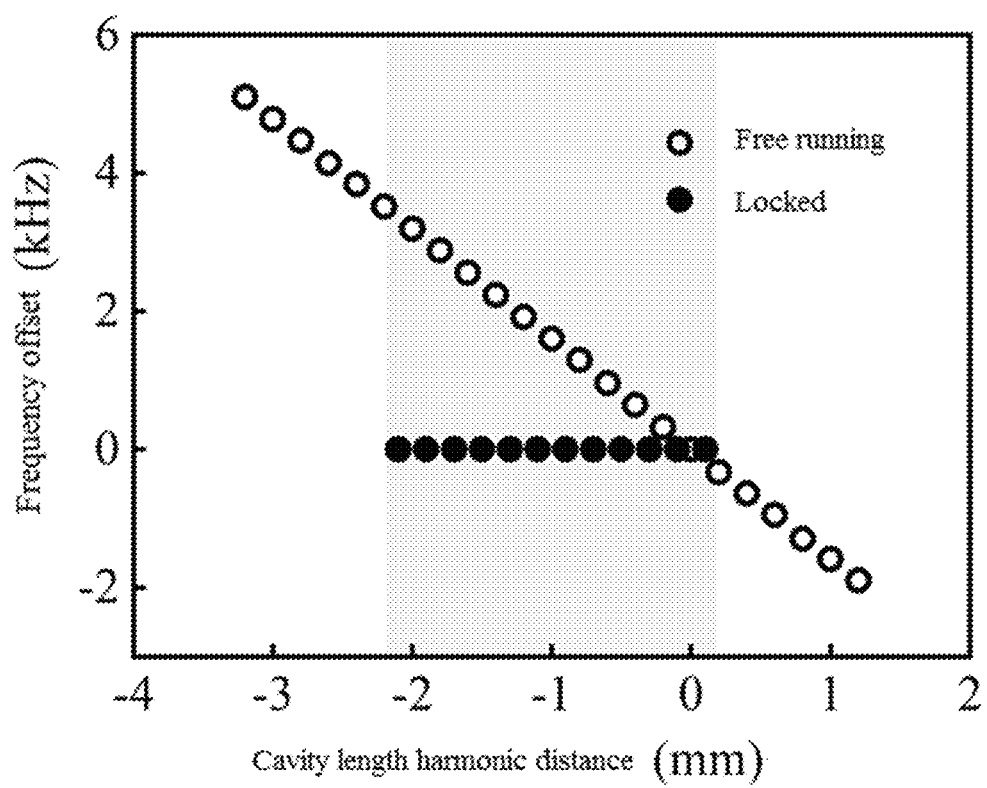
FIG. 5 is a schematic graph showing effects about the cavity range for the passive locking system according to some examples of the present disclosure.

FIG. 5 is a schematic graph showing effects about the cavity length locking range of the laser according to examples of the present disclosure. In the repetition rate locking state, a tolerable repetition rate offset is 3.5 kHz, and the corresponding cavity length locking range is 2.2 mm, which is improved by at least 1 order of magnitude relative to a solution based on the piezoelectric ceramic, and provides an effective means for long-term and stable running of the high-precision repetition rate locking. It is worth mentioning that the repetition rate locking apparatus in examples of the present disclosure avoids an active control circuit, but adopts a full-polarization-maintaining fiber architecture, and does not require additional temperature control and vibration isolation. The presented passive servo has simple, compact, and robust features and other advantages.

The above embodiments or examples are only used to illustrate the present disclosure, and the scope of the present disclosure is not limited to the above described embodiments or examples. For example, the fiber Bragg grating in the laser resonant cavity may be replaced with an optic fiber mirror, and a shorter pulse output can be obtained under the aid of the intra-cavity dispersion control. The gain medium in the laser resonant cavity can be replaced by an ytterbium-doped fiber, so as to achieve laser pulse output of different wavelength. In virtue of the distribution and transmission of the radio-frequency pulse signal, a pulse laser network with repetition rate locking can be constructed, which share the same clock standard, and the wavelength and repetition rate of different nodes can be different, which can easily realize synchronous/asynchronous operation between homochromatic/heterochromatic laser pulses.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," and "counterclockwise" should be construed to refer to the orientation as then described or as shown in the drawings under discussion. These relative terms are for convenience of description and do not require that the present invention be constructed or operated in a particular orientation.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means two or more than two, unless specified otherwise.

In the present invention, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples. In addition, in the absence of contradiction, those skilled in the art can combine the different embodiments or examples described in this specification, or combine the features of different embodiments or examples.

Although explanatory embodiments have been shown and described, it would be appreciated by those skilled in the art that the above embodiments cannot be construed to limit the present disclosure, and changes, alternatives, modifications and variant can be made in the embodiments without departing from spirit, principles and scope of the present disclosure.

What is claimed is:

1. A high-precision repetition rate locking apparatus for an ultra-fast laser pulse, comprises:
   an electronic controlling component, configured to provide a high-precision radio-frequency electrical pulse signal, and comprising:
   a standard clock, configured to provide a high-precision frequency standard;
   a pulse generator (PG), configured to provide an electrical pulse signal with adjustable repetition rate, pulse width and voltage magnitude;
   a signal generator (SG), connected to the standard clock and the PG, and configured to provide a stable frequency signal for the PG;
   a loop mirror, connected to the electronic controlling component;
   a phase-shift adjusting component, disposed in the loop mirror and connected to the electronic controlling component, and configured to implement phase modulation through electrically induced refractive index change of a crystal in the phase-shift adjusting component;

a resonant cavity component, comprising a phase shifter, a doped fiber, a laser diode, a wavelength division multiplexer and a reflector, and configured to generate a mode-locked pulse; and a detecting component, configured to measure a repetition rate of an output pulse;

wherein the detecting component comprises a photoelectric detector and a frequency counter.

2. The high-precision repetition rate locking apparatus according to claim 1, wherein the phase-shift adjusting component is a phase modulator.

3. The high-precision repetition rate locking apparatus according to claim 2, wherein the phase modulator is an electro-optic modulator based on a lithium niobate crystal.

4. The high-precision repetition rate locking apparatus according to claim 1, wherein the PG is a nanosecond PG for providing an ultrashort pulse.

5. The high-precision repetition rate locking apparatus according to claim 1, wherein the standard clock is a hydrogen clock or a rubidium clock.

6. The high-precision repetition rate locking apparatus according to claim 1, wherein the electrical pulse signal generated by the PG has a pulse width from 1 to 15 ns and an adjustable amplitude range from 0 to 3 V.

7. The high-precision repetition rate locking apparatus according to claim 1, wherein the doped fiber is an erbium-doped fiber or an ytterbium-doped fiber.

8. The high-precision repetition rate locking apparatus according to claim 1, wherein the reflector is a fiber Bragg grating or an optic fiber mirror.

* * * * *